C. A. LARE.
FLASH LIGHT IGNITION SYSTEM FOR CAMERAS.
APPLICATION FILED FEB. 11, 1916.
1,221,063.
Patented Apr. 3, 1917.
2 SHEETS—SHEET 2.
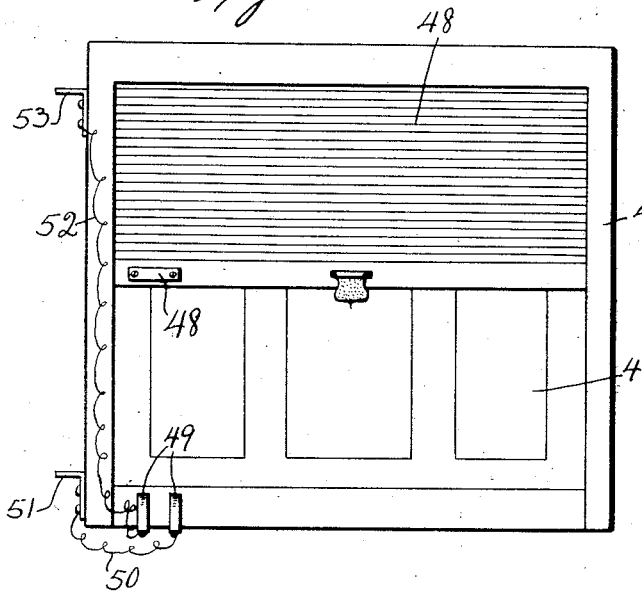
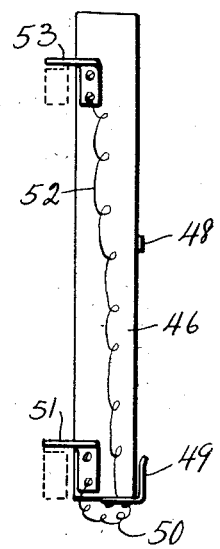
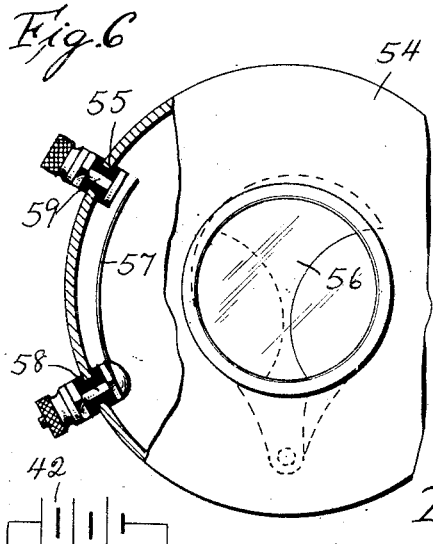
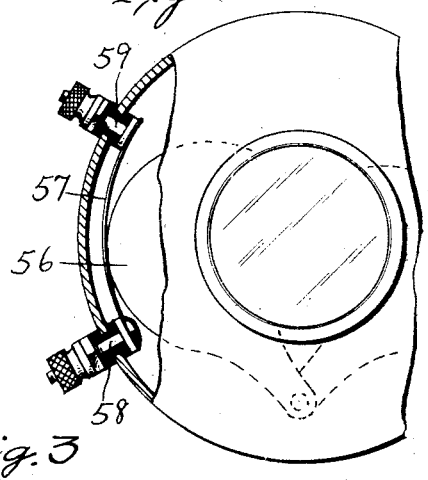
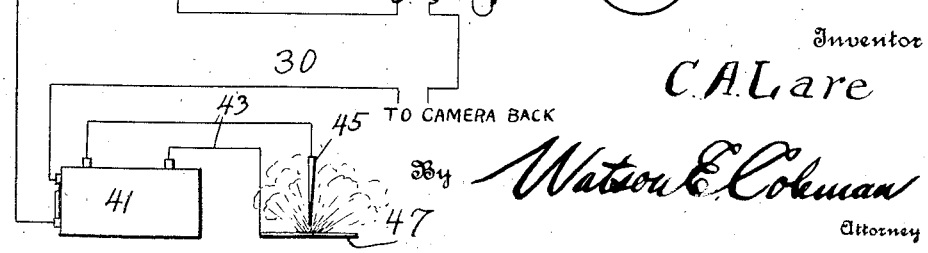
Inventor
C. A. Lare
By Watson E. Coleman
Attorney

UNITED STATES PATENT OFFICE.

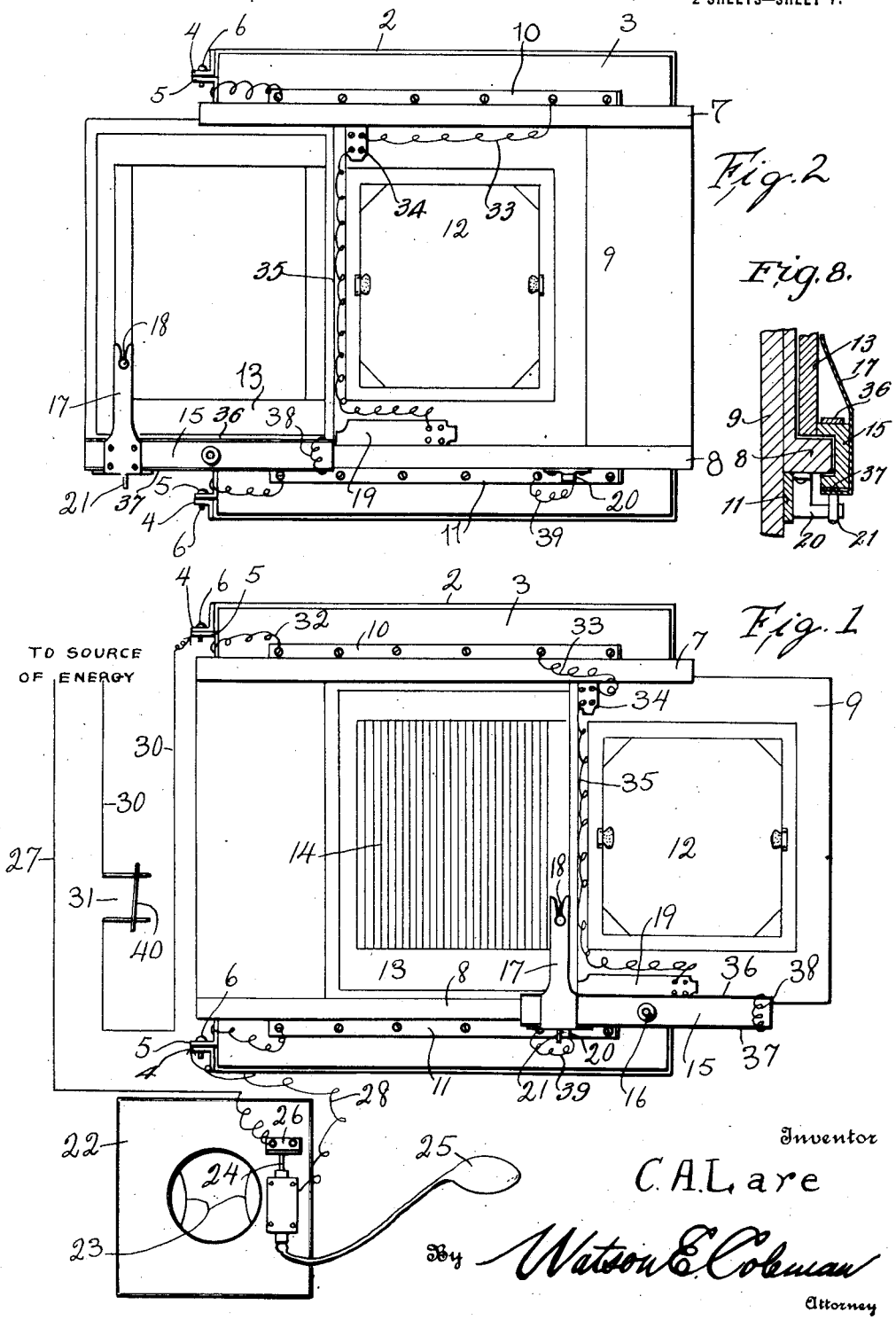

CHARLES A. LARE, OF EUGENE, OREGON.

FLASH-LIGHT-IGNITION SYSTEM FOR CAMERAS.

1,221,063.  Specification of Letters Patent.  Patented Apr. 3, 1917.

Application filed February 11, 1916. Serial No. 77,716.

*To all whom it may concern:*

Be it known that I, CHARLES A. LARE, a citizen of the United States, residing at Eugene, in the county of Lane and State of Oregon, have invented certain new and useful Improvements in Flash-Light-Ignition Systems for Cameras, of which the following is a specification, reference being had to the accompanying drawings.

My invention relates to attachments for photographic cameras, and particularly to an attachment for automatically igniting flash powder or flash paper upon the operation of a camera shutter.

The primary object of my invention is the provision of a very simple means for automatically igniting flash powder when the shutter is operated, the parts being so arranged, however, that the flash light powder cannot be ignited until the shutter is fully open.

Another object of my invention is the provision of means for automatically igniting flash light powder in connection with a camera, so arranged that ignition will not take place unless the plate holder or film holder is in place with the slide fully drawn.

A further object is to provide a device which will not in any way interfere with the regular working of the camera for daylight work, and which is always ready for another operation.

A further object of my invention is to provide a device which can be attached in a few minutes to any make of camera, to any portrait shutters or plate holders, and it is also adapted to be used with the shutters of hand-cameras.

Still another object of the invention is to provide a device for igniting flash powder, which is operated either by the bulb shutter release or by the plunger shutter release, and that does away with the cumbersome rubber tubing that, as cameras are now constructed, runs from the shutter bulb release to the flash.

Other objects will appear in the course of the following description.

My invention is illustrated in the accompanying drawings, wherein:

Figure 1 is a rear end elevation of the camera and camera back and an elevation of the shutter, showing diagrammatically the electrical connections for exploding a flash light powder, this figure also showing the slide shifted to its exposure position;

Fig. 2 is a like view to Fig. 1 but with the connections to the shutter omitted and showing the parts in the position they occupy when the camera is being focused;

Fig. 3 is a diagrammatic view showing the wiring for the camera;

Fig. 4 is a rear elevation showing a modified form of camera back;

Fig. 5 is an end elevation thereof;

Figs. 6 and 7 are face views, partly broken away, of a shutter casing, Fig. 6 showing the shutter in its closed position and Fig. 7 showing the shutter opened.

Fig. 8 is a fragmentary vertical section through the lower portion of the camera back, the roll 19, guide 8, slide 9 and the carrier 15.

In Figs. 1 to 3 I show, somewhat diagrammatically, the general principles of my invention and its application to an ordinary camera shutter and an ordinary camera back. Referring to these figures, 2 designates the box of the camera to which the camera back is adapted to be connected. In a large number of cameras the camera back, which in the figures is designated 3, is removable from the box or body 2 so as to permit of different sized camera backs being applied thereto, that is, camera backs adapted for cabinet pictures or photographs of less or greater size. The connection between the camera back and the body or box of the camera is provided by means of hinges or clips. In the drawings these hinges or clips are designated 4 and 5, the clips 4 being attached to the body of the camera while the clips 5 are attached to the camera back 3. As illustrated, these clips are engaged with each other by means of the pintles 6, but I do not wish to be limited thereto as any form of metallic clip whereby the camera back is engaged to the body of the camera may be used.

In the form of camera illustrated in Figs. 1 and 2, the camera back is provided with longitudinally extending guides 7 and 8 which are of wood. Slidably mounted within these guides is the plate holding slide 9 which is constructed in any ordinary or usual manner and is adapted to be shifted within the guides 7 and 8 from the position shown in Fig. 1 to that shown in Fig. 2, and vice versa. Disposed above and below these guides 7 and 8 respectively are the brass rails 10 and 11. The slide 9 carries upon it at one end the ground glass 12 and at the other end the plate holder 13. Normally the front of this plate holder is closed by a screen 14 or "curtain" formed of strips flexibly connected to each other. When the parts are in the position shown in Fig. 2 the front of the plate holder is closed by the curtain 14. When, however, the parts are disposed in the position shown in Fig. 1, this curtain 14 is drawn from the front across the back of the plate holder and the plate is exposed.

The slide 9 with the ground glass and the plate holder 13 is shifted transversely upon the camera back by means of a sliding carrier 15 which slides upon the guide 18 or in any other suitable manner. This carrier 15 has upon it a knob 16 whereby the carrier may be manipulated, and extending upward from the carrier is an arm 17 bifurcated at its upper end to engage a stud 18 mounted upon the margin of the curtain 14. When the parts are in the position shown in Fig. 2 and the ground glass 12 is disposed in front of the camera, the arm 17 is disposed in the extreme left hand side of the plate holder 13 and the carrier 15 is disposed at the extreme left hand end of the guide 8. Now when it is desired to shift the slide 9 from a position where the ground glass is disposed behind the camera to a position where the plate carried in the plate holder shall be disposed behind the camera, the operator takes hold of the knob 16 and shifts the slide to the right. The slide and the carrier 15 move together to the right until such time as the slide is stopped in its movement. The carrier 15 during this portion of the movement has been engaged with a resilient brass plate or spring 19 mounted upon the slide just below the ground glass 12. When the movement of the slide 9 is stopped the friction of this spring upon the carrier is overcome and the carrier continues its movement until it is moved to the position shown in Fig. 1 and this movement carries with it the arm 17 and shifts the curtain 14 from in front of the plate carried in the holder 13 until this curtain is disposed at the back of the holder, as illustrated in Fig. 1. Mounted upon the under side of the guide 8 is a stop 20 and the carrier 15 is provided with a downwardly projecting stud 21 formed upon the metallic plate which engages this stop and limits the movement of the carrier to the right, as illustrated in Fig. 1. All of these parts are old and well known and are present in many different forms of cameras, particularly cameras designed for taking portraits. The front of the camera is provided with any usual or ordinary shutter, as illustrated in Fig. 1. The details of this shutter are not illustrated for the reason that any standard shutter may be used.

In Fig. 1, 22 designates the front plate of the shutter, 23 the leaves of the shutter, 24 a projectable spindle whereby the leaves of the shutter are operated or released to shift to their closed position, and 25 a bulb operatively connected to the spindle 24. It will be understood that the showing in Fig. 1 is purely illustrative and that the particular type of shutter and the particular type of shutter release are of no importance. Disposed upon the plate 22, which is of insulating material, or insulated therefrom is a contact plate 26 with which the spindle 24, when the shutter is fully opened, is adapted to engage.

Now the purpose of my invention is to provide means for igniting the flash light powder provided the sensitized plate is in its exposed position in the camera, and when the shutter is fully opened and not before. To this end I connect the contact 26 in circuit with any suitable source of energy by means of a wire or conductor 27, and from the metallic casing of the spindle 24 extends a wire 28 which engages with one of the members 4 which connects the camera back to the camera body. From this member 4 current will pass to the member 5 which contacts therewith and from this member 5, which is illustrated as the lowermost of the members 5, a wire 29 passes to the metallic rail or bar 11. The other or upper member 4 on the camera is connected by means of a wire 30 to the source of current, and in the circuit of this wire 30 is an ignition device of any suitable description which will be later described but which is shown as a fuse wire bridging a gap 31 in the wire 30. From the uppermost member 5 extends a wire 32 to the rail 10 or metallic bar, and from this rail 10 extends a wire 33 or conductor to a metallic plate 34 which is ordinarily found on portrait cameras. From the plate 34 extends a wire 35 which extends to the spring plate 19.

Mounted upon the upper face of the carrier 15 is a metallic plate 36 which when the parts are in the position shown in Fig. 2 is out of contact with the spring clip 19 but which when the parts are in the position shown in Fig. 1 is in contact with the clip 19. A metallic plate 37 is mounted upon the bottom of the carrier 15 and this is connected to the plate 36 by means of a wire 38 or other conducting member. This plate 37 does not touch the metallic plate 11, nor does it touch the stop 20 even when the parts are in the position shown in Fig. 2. When the parts are in the position shown in Fig. 1, however, this metallic plate 37 engages with the metallic stop 20 and this metallic stop is connected by means of a wire 39 to the rail 11. It will be obvious now that when the slide 9 is shifted to the position shown in Fig. 2 a circuit through the source of energy and the ignition device will be broken, between the member 19 and the plate 36, and also between the plate 37 and the stop 20. When, however, the slide 9 is shifted fully over to a position to carry the plate holder in front of the camera then the circuit, as far as the camera back is concerned, will be completed through the member 19 to plate 36, thence to plate 37, thence to the stud 21, then to the stop 20, and thence by wire 39 to rail 11. There will only be one break now in the circuit including the source of energy and the ignition device, which break will be between the spindle 24 and the contact 26. Now when the bulb 25 is pressed or the spindle 24 forced outward in any other manner, this break will be closed and current will pass through the wires 27 to 30 which will ignite the fuse. Inasmuch as the spindle 24 will not engage the contact 26 until the shutter is fully opened, it is obvious that the flash light powder will not ignite prematurely, and it is further obvious that this flash light powder will not be ignited unless the slide carrying the plate has been shifted over to its fully exposed position and the curtain covering the plate has been shifted from in front of the plate. Thus explosion cannot occur unless all the parts are in proper position for taking a picture.

While I have illustrated in Fig. 1 a fuse 40 as being disposed across the gap 31, it is to be understood that I do not wish to be in any way limited to the particular means for securing the ignition of the flash light powder. Thus in Fig. 3 I have shown the manner in which a battery may be used for the purpose of igniting the flash light powder. In Fig. 3 the wire 30 is shown as going into a spark coil box 41, the spark coil therein (not shown) being connected in circuit with a battery 32 and the battery in turn being connected to the contact 26. The wires 43 extend from the secondary of the spark coil and connect respectively to the electrodes 44 and 45.

While I have illustrated the manner in which an ordinary portrait camera may be wired, this is purely illustrative and in Figs. 4 and 5 I have shown a plate holder of a different form, showing the manner in which the gap in the circuit may be closed when the plate holder is in position on a camera and the slide curtain shifted from in front of the plate. In these figures, 46 designates the plate holder which may be of any ordinary construction and has the back 47, and a slide curtain 48 formed of flexibly connected strips which as usual is mounted upon the plate holder and is adapted to be shifted either to carry the slide curtain in front of the plate or to carry it down behind the back 47. As shown in Fig. 4, the slide curtain is half way shifted. The slide curtain carries upon it the metallic contact member 48. Mounted upon the plate holder 46 are the spaced contacts 49 with which the contact 48 is adapted to engage when the slide curtain is pulled entirely from in front of the plate. One of the contacts 49 is connected by means of a wire 50 to one of the members 51 which connect the plate holder to the box or body of the camera while the other contact 49 is connected by means of the wire 52 to the other member 53 whereby the plate holder is connected to the body of the camera. The circuit closing mechanism connected to the shutter is supposed to operate in the same manner as heretofore described, but is not illustrated in connection with Fig. 4 as it is believed that the connection is clear. When now the shutter is operated in the manner illustrated in Fig. 1, assuming that the curtain 48 is fully withdrawn from in front of the plate, the circuit is closed and ignition results. Unless, however, the curtain 48 has been drawn to fully expose the plate within the holder the circuit will be broken between the contact 49 and explosion will not take place.

In Figs. 6 and 7 I show another and in some respects a preferable manner of closing the ignition circuit through the shutter. In this figure, 54 represents a shutter casing of any suitable character having a side wall 55. Shutter leaves 56 are mounted within the casing in any suitable way and this shutter may be of any suitable character, as for instance, a shutter having a plurality of leaves moving tangentially to the axis of the lens or a shutter having leaves moving transversely to the axis of the lens, or a shutter opening upon hinges. In the construction shown in Figs. 6 and 7 the shutters are pivoted and open transversely of the axis of the lens. Mounted in the path of one of these leaves is a spring contact 57 which at one end is permanently connected to a binding screw 58 properly insulated from the wall 55. This contact 57 is resilient and normally its resiliency holds it away from electrical engagement with the contact end of a binding screw 59. When, however, the shutter flies open to its full extent one of the leaves 56 will strike the spring 57 and bring it in contact with the binding screw 59, thus closing the circuit through the ignition mechanism in the same manner as heretofore described. In other words, the contact spring is the equivalent of the spindle 24 in Fig. 1 and the binding screw 59 is the equivalent of the contact member 26.

While I have illustrated my invention as applied to a certain type of camera and certain types of shutters, it is to be understood that it is not limited to the exact arrangement illustrated. It will be obvious that each different make or kind of camera or shutter will require a slightly different manner of wiring and a slightly different manner of connecting the wiring to the mechanism of the camera, but it is believed that the principle of my invention is applicable to many different forms of cameras.

My manner of providing for the automatic ignition of a flash light does not in any way interfere with the regular use of the camera for day-light work. It is only necessary to leave out the flash powder from the tray into which the fuse 40 or the electrode 45 dips. Furthermore, the electrical connections to the camera back of the shutter may be very readily removed or attached. My invention is simple and effective and does away with the old, slow, and uncertain method that has been used in the past. With my mechanism one pressure of the bulb release or plunger release opens the shutter, which, when fully opened, ignites the flash powder provided the plate holder is in position and the slide covering the plate is fully drawn. When the ground glass is in position for focusing, the shutter may be opened without any ignition of the flash powder.

Having thus described my invention, what I claim is:

1. The combination with a photographic camera including a plate holder movable into or out of an exposure position, of a flash ignition circuit having a gap, and means automatically acting to close said gap when the plate holder is in a position for exposure.

2. The combination with a photographic camera including a shutter, shutter operating mechanism, and a plate holder movable into or out of an exposure position, of a flash ignition circuit broken at two points, means automatically closing one of said breaks when the plate holder is in position for exposure, and means closing the other of said breaks when the shutter is in its fully open position.

3. The combination with a photographic camera including a plate holder movable into or out of an exposure position, and a screen or curtain movable from in front of the plate holder to the rear thereof to a position to expose the plate, of an interrupted flash ignition circuit, and means acting automatically to close said circuit when the plate holder is in position for exposure and the screen or curtain has been fully withdrawn from in front of the plate.

4. The combination with a photographic camera including a shutter, a plate holder movable into or out of an exposure position, and a sliding screen movable into or out of a position to expose the plate in said holder, of a normally open flash ignition circuit, and means automatically closing said circuit upon the operation of the shutter after the plate holder has been shifted to its exposure position and the screen has been fully withdrawn from before the plate.

5. The combination with a photographic camera including a shutter, a plate holder movable into or out of an exposure position, and a screen or curtain movable from in front of the plate holder to a position to expose the photographic plate therein, of a flash ignition circuit broken at two points, means automatically closing one of said breaks in the circuit when the plate holder is in position for exposure and the screen or curtain has been fully withdrawn from in front of the plate, and means closing the other of said breaks in the circuit when the shutter is in its fully opened position.

6. The combination with a photographic camera, and a shutter including a movable leaf, of a flash light ignition circuit having terminals spaced from each other and disposed adjacent the shutter, and a circuit closing member attached to one of said terminals and resiliently supported normally out of engagement with the other terminal, said terminal being disposed in the path of movement of the shutter and shifted to a circuit closing position by engagement with the shutter leaf when the leaf of the shutter is fully retracted from in front of the lens.

7. In a photographic camera, a plate holder, a manually shiftable curtain or screen slidingly mounted in the plate holder for movement from a position in front of the plate holder, to thereby screen the plate therein, to a position entirely withdrawn from in front of said holder, an ignition circuit including spaced contacts, and means movable with the screen for bridging the gap between said contacts upon the movement of the screen to a position to fully expose the plate carried in the holder.

8. In a photographic camera, a back, a slide mounted upon said camera back, a plate holder forming part of the slide and movable therewith, a screen or curtain mounted upon the plate holder and movable from a position over the front of the plate holder to a position entirely over the back of the plate holder, a carrier shiftable with and independent of the slide and operatively connected to said screen, a flash light ignition circuit having a gap, and means mounted upon the carrier for closing said gap in the ignition circuit when the slide has been shifted by the carrier to an exposure position and the screen has been shifted by the carrier to a position to fully expose the plate in the plate holder.

9. In a photographic camera, a camera back, a slide mounted upon said back for transverse movement, a plate holder carried on the slide, a sliding curtain mounted upon the plate holder and movable from a position in front of the plate holder to a position entirely in the rear thereof, a carrier slidably mounted upon the plate holder and operatively connected to the sliding curtain, a metallic plate mounted upon the slide and frictionally engaging said carrier to prevent its movement independent of the slide, a stop limiting the movement of the slide, a metallic member mounted upon the carrier and engageable with said stop when the carrier is shifted to a position to fully open the sliding curtain, upper and lower metallic rails mounted upon the camera back, electrical connections from one of said rails to the first-named metallic member, a contact member mounted upon the carrier adapted to engage with said metallic member when the carrier is shifted into engagement therewith, a contact member mounted on the carrier and electrically engaged with the first-named contact member and adapted to engage said stop when the carrier is shifted to a position to fully expose the plate in the plate holder, an electrical connection between the stop and the lower metallic rail, and a flash ignition circuit in which said rails are electrically connected.

10. In a photographic camera, a camera back, a slide mounted upon said back for transverse movement, a plate holder carried on the slide, a sliding curtain mounted upon the plate holder and movable from a position in front of the plate holder to a position entirely in the rear thereof, a carrier slidably mounted upon the plate holder and operatively connected to the sliding curtain, a metallic plate mounted upon the slide and frictionally engaging said carrier to prevent its movement independent of the slide, a stop limiting the movement of the slide, a metallic member mounted upon the carrier and engageable with said stop when the carrier is shifted to a position to fully open the sliding curtain, upper and lower metallic rails mounted upon the camera back, electrical connections from one of said rails to the first-named metallic member, a contact member mounted upon the carrier adapted to engage with said metallic member when the carrier is shifted into engagement therewith, a contact member mounted on the carrier and electrically engaged with the first-named contact member and adapted to engage said stop when the carrier is shifted to a position to fully expose the plate in the plate holder, an electrical connection between the stop and the lower metallic rail, metallic supporting members mounted upon the camera back, metallic supporting members on the camera with which said first-named supporting members engage, and a flash ignition circuit including the supporting members on the camera body.

11. In a photographic camera, a camera back, a slide mounted upon said back for transverse movement, a plate holder carried on the slide, a sliding curtain mounted upon the plate holder and movable from a position in front of the plate holder to a position entirely in the rear thereof, a carrier slidably mounted upon the plate holder and operatively connected to the sliding curtain, a metallic plate mounted upon the slide and frictionally engaging said carrier to prevent its movement independent of the slide, a stop limiting the movement of the slide, a metallic member mounted upon the carrier and engageable with said stop when the carrier is shifted to a position to fully open the sliding curtain, upper and lower metallic rails mounted upon the camera back, electrical connections from one of said rails to the first-named metallic member, a contact member mounted upon the carrier adapted to engage with said metallic member when the carrier is shifted into engagement therewith, a contact member mounted on the carrier and electrically engaged with the first-named contact member and adapted to engage said stop when the carrier is shifted to a position to fully expose the plate in the plate holder, an electrical connection between the stop and the lower metallic rail, metallic supporting members mounted upon the camera back, metallic supporting members on the camera with which said first-named supporting members engage, a shutter mounted upon the body, a circuit closer shifted to a closed position by said shutter, and a flash ignition circuit including one of the supporting members on the camera body and said circuit closer.

In testimony whereof I hereunto affix my signature in the presence of two witnesses.

CHARLES A. LARE.

Witnesses:
J. M. DEVERS,
EDYTHE B. JOHNSON.